United States Patent
Matsuike

(10) Patent No.: US 10,761,596 B2
(45) Date of Patent: Sep. 1, 2020

(54) IMAGE PROCESSING APPARATUS, IMAGE PROCESSING METHOD, AND PROGRAM

(71) Applicant: SONY INTERACTIVE ENTERTAINMENT INC., Tokyo (JP)

(72) Inventor: Hiroshi Matsuike, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 50 days.

(21) Appl. No.: 15/757,686

(22) PCT Filed: Oct. 11, 2016

(86) PCT No.: PCT/JP2016/080083
§ 371 (c)(1),
(2) Date: Mar. 6, 2018

(87) PCT Pub. No.: WO2017/065126
PCT Pub. Date: Apr. 20, 2017

(65) Prior Publication Data
US 2019/0041974 A1    Feb. 7, 2019

(30) Foreign Application Priority Data
Oct. 15, 2015    (JP) ................................. 2015-203959

(51) Int. Cl.
*G06F 3/01*    (2006.01)
*G09G 5/00*    (2006.01)
(Continued)

(52) U.S. Cl.
CPC .............. *G06F 3/011* (2013.01); *G06F 3/012* (2013.01); *G06F 3/017* (2013.01); *G06F 3/038* (2013.01);
(Continued)

(58) Field of Classification Search
CPC .......... G06F 3/011; G06F 3/012; G06F 3/017; G06F 3/02; G06F 3/0346; G06F 3/038;
(Continued)

(56) References Cited

U.S. PATENT DOCUMENTS

2008/0076567 A1*    3/2008    Dohta ..................... A63F 13/10
463/37
2009/0079745 A1*    3/2009    Fun ..................... G06F 3/04815
345/474

(Continued)

FOREIGN PATENT DOCUMENTS

JP    2013-29958 A    2/2013

OTHER PUBLICATIONS

Han et al., Remote Interaction for 3D Manipulation, Apr. 14-15, 2010, CHI 2010: Work-in-Progress, 4225-4230 (Year: 2010).*

(Continued)

*Primary Examiner* — Richard J Hong
(74) *Attorney, Agent, or Firm* — Katten Muchin Rosenman LLP

(57) ABSTRACT

To provide an operation method for intuitively moving a viewpoint in a virtual space that is different from a method for inputting a moving direction by a button or stick operation. An image processing apparatus includes real position acquisition means that acquires a real position instructed by a user in a real space, representative position determination means that determines, on the basis of movement of the acquired real position during a predetermined input, a virtual representative position that is a position representing the user in a virtual space, and rendering means that renders a three-dimensional image based on the determined virtual representative position.

9 Claims, 12 Drawing Sheets

(51) Int. Cl.

| | |
|---|---|
| *G09G 5/36* | (2006.01) |
| *G06F 3/0481* | (2013.01) |
| *G06F 3/038* | (2013.01) |
| *G06T 7/70* | (2017.01) |
| *G06F 3/0346* | (2013.01) |
| *G06T 15/20* | (2011.01) |
| *G06T 19/00* | (2011.01) |
| *G06T 19/20* | (2011.01) |
| *G06F 3/02* | (2006.01) |

(52) U.S. Cl.
CPC ........ *G06F 3/0346* (2013.01); *G06F 3/04815* (2013.01); *G06T 7/70* (2017.01); *G06T 15/20* (2013.01); *G06T 19/003* (2013.01); *G06T 19/20* (2013.01); *G09G 5/00* (2013.01); *G09G 5/36* (2013.01); *G06F 3/02* (2013.01); *G06T 2207/30196* (2013.01); *G06T 2219/008* (2013.01); *G06T 2219/2016* (2013.01)

(58) Field of Classification Search
CPC ..... G06F 3/04815; G06T 15/20; G06T 19/00; G06T 19/003; G06T 19/20; G06T 2207/30196; G06T 2219/008; G06T 2219/2016; G06T 7/70; G09G 5/00; G09G 5/36; A63F 13/24; A63F 13/211; A63F 13/10; A63B 24/0087
See application file for complete search history.

(56) References Cited

U.S. PATENT DOCUMENTS

| | | | |
|---|---|---|---|
| 2011/0009241 A1* | 1/2011 | Lane | A63B 24/0087 482/8 |
| 2011/0053691 A1* | 3/2011 | Bryant | A63F 13/211 463/37 |
| 2012/0302347 A1* | 11/2012 | Nicholson | A63F 13/24 463/37 |
| 2013/0027393 A1 | 1/2013 | Fujiwara et al. | |
| 2013/0104085 A1* | 4/2013 | Mlyniec | G06F 3/04845 715/849 |
| 2013/0104086 A1* | 4/2013 | Mlyniec | G06T 19/20 715/849 |

OTHER PUBLICATIONS

Notification of Reason for Refusal dispatched Dec. 11, 2018, from Japanese Patent Application No. 2017-545193, 6 sheets.
Koichi Matsuda et al., "3D User Interface", Maruzen, 2005, first edition, p. 171-175, 216, 231-232.
International Search Report and Written Opinion dated Nov. 15, 2016, from the corresponding PCT/JP2016/080083.
Koichi Matsuda et al., 3D User Interfaces, Maruzen Co., Ltd., Sep. 30, 2005 (Sep. 30, 2005), pp. 171 to 175, 216, 231 to 232.

\* cited by examiner

IMAGE PROCESSING APPARATUS, IMAGE PROCESSING METHOD, AND PROGRAM

TECHNICAL FIELD

The present invention relates to an image processing apparatus, an image processing method, and a program.

BACKGROUND ART

There exists a technology where when a user inputs a moving direction by operating a button or stick of a controller, the position of the user in a virtual space is moved in the inputted direction and a three-dimensional image viewed from the position of the user that has been moved is displayed.

SUMMARY

Technical Problem

In the case of displaying the three-dimensional image in the virtual space, changing its viewpoint by operating the button or stick of the controller has not been an intuitive operation for at least some users.

The present invention has been made in view of the above-described problem, and an object of the present invention is to provide an operation method for intuitively moving a viewpoint in a virtual space that is different from a method for inputting a moving direction by operating a button or a stick.

Solution to Problem

In order to solve the above-described problem, an image processing apparatus according to the present invention includes real position acquisition means that acquires a real position instructed by a user in a real space, representative position determination means that determines, on the basis of movement of the acquired real position during a predetermined input, a virtual representative position that is a position representing the user in a virtual space, and rendering means that renders a three-dimensional image based on the determined virtual representative position.

In addition, an image processing method according to the present invention includes a step of acquiring a real position instructed by a user in a real space, a step of determining, on the basis of movement of the acquired real position during a predetermined input, a virtual representative position that is a position representing the user in a virtual space, and a step of rendering a three-dimensional image based on the determined virtual representative position.

In addition, a program according to the present invention causes a computer to function as real position acquisition means that acquires a real position instructed by a user in a real space, representative position determination means that determines, on the basis of movement of the acquired real position during a predetermined input, a virtual representative position that is a position representing the user in a virtual space, and rendering means that renders a three-dimensional image based on the determined virtual representative position.

According to the present invention, it is possible to intuitively change a viewpoint in a virtual space through an operation method that is different from a method for inputting a moving direction by a button or stick operation.

In an embodiment of the present invention, the representative position determination means may move the virtual representative position such that an amount of movement of the virtual representative position is determined according to an amount of movement of the real position.

In an embodiment of the present invention, when the real position moves closer to a real representative position representing the user, the representative position determination means may determine the virtual representative position that is the position representing the user in the virtual space, such that the virtual representative position moves closer to a virtual position corresponding to the real position in the virtual space.

In an embodiment of the present invention, the representative position determination means may determine the virtual representative position on the basis of a component in a first direction of a movement vector from a real reference position that is a real position instructed by the user at a given point in time to a real current position that is a current position instructed by the user.

In an embodiment of the present invention, the first direction may be a direction of a straight line connecting the real reference position and the real representative position that have been projected on a horizontal plane.

In an embodiment of the present invention, the representative position determination means may determine a direction of the user in the virtual space on the basis of a component in a second direction of the movement vector in the real space, and the second direction may be different from the first direction.

In an embodiment of the present invention, when the real reference position is located in a first region, the representative position determination means may determine the virtual representative position on the basis of the component in the first direction of the movement vector from the real reference position to the real current position, while when the real reference position is located in a second region different from the first region, the representative position determination means may determine the direction of the user in the virtual space on the basis of the component in the second direction of the movement vector.

In an embodiment of the present invention, the first region may be located in front of the real representative position, while the second region may be located on a side of the first region.

DESCRIPTION OF EMBODIMENT

Hereinafter, an embodiment of the present invention will be described with reference to the drawings. Constituent elements having the same function among constituent elements that appear are given the same symbol, and description thereof is omitted.

Figure 1:
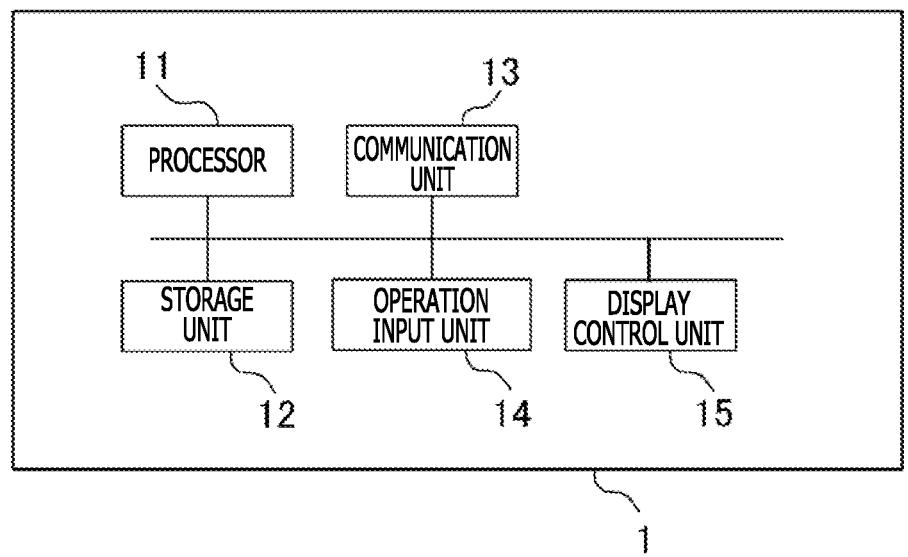
FIG. 1 is a diagram illustrating an example of a hardware configuration of an image processing apparatus according to an embodiment of the present invention.

FIG. 1 is a diagram illustrating an example of a hardware configuration of an image processing apparatus 1 according to the embodiment of the present invention. The image processing apparatus 1 is a personal computer, a game machine for home use, or a mobile information terminal. The image processing apparatus 1 includes a processor 11, a storage unit 12, a communication unit 13, an operation input unit 14, and a display control unit 15.

The processor 11 operates according to a program stored in the storage unit 12 and controls the communication unit 13, the operation input unit 14, the display control unit 15, and the like. Note that the above-described program may be stored and provided in a computer-readable storage medium such as flash memory or may be provided via a network such as the Internet.

The storage unit 12 includes memory devices such as dynamic random access memory (DRAM) and flash memory. The storage unit 12 stores the above-described program. In addition, the storage unit 12 stores information and calculation results inputted from the processor 11, the communication unit 13, and the like.

The communication unit 13 includes an integrated circuit, a connector, an antenna, and the like configuring a wired local area network (LAN) and a wireless LAN. The communication unit 13 has a function of communicating with other devices via a network. Under the control of the processor 11, the communication unit 13 inputs information received from other devices to the processor 11 and the storage unit 12 and transmits the information to other devices.

The operation input unit 14 is a circuit that acquires input from hardware that detects an operation by a user. The operation input unit 14 acquires the input from, for example, a position input device with which the user inputs a position or an input device such as a keyboard or the like. The operation input unit 14 then inputs the detected information to the processor 11 and the storage unit 12.

The display control unit 15 includes a circuit that controls a display output device such as a display. Under the control of the processor 11, the display control unit 15 causes the display output device to display an image.

Figure 2:
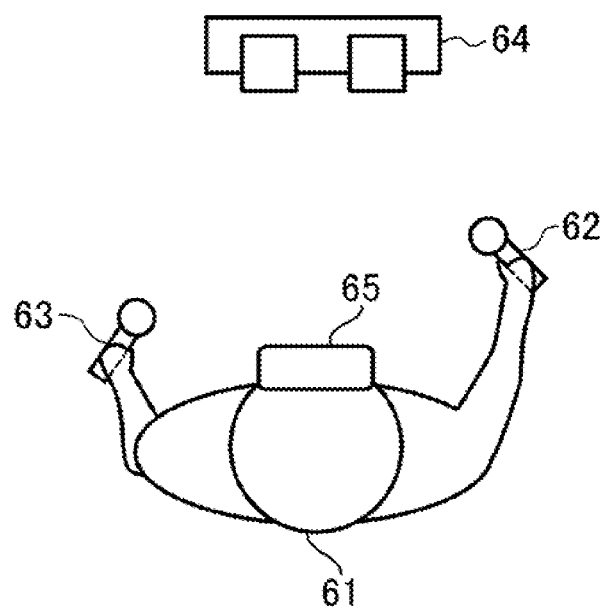
FIG. 2 is a diagram for describing a method for using an input/output device when a user uses the image processing apparatus.

FIG. 2 is a diagram for describing an example of a method for using input devices and the like when a user 61 uses the image processing apparatus 1. The example in FIG. 2 is a diagram in which the user 61 is viewed from above. In the example of the present embodiment, motion controllers 62 and 63 and a camera 64 are used as the input devices, and a head mounted display 65 is used as the display output device.

Each of the motion controllers 62 and 63 includes a ball section provided for the camera 64 to recognize a position, as well as a holding section to be gripped by the user 61. The holding sections are provided with buttons. When the user 61 operates the buttons, the motion controllers 62 and 63 transmit information about the button operation to the operation input unit 14 via wireless, and the operation input unit 14 receives that information. The camera 64 captures an image including the ball sections of the motion controllers 62 and 63. On the basis of the positions and sizes of the ball sections within the captured image, the camera 64 detects real instruction positions instructed by the motion controllers 62 and 63 in a real space. The operation input unit 14 acquires the real instruction positions of the motion controllers 62 and 63 that have been detected.

The head mounted display 65 is a display worn on the head of the user 61 and displays an image in front of the user 61. When parallax is taken into consideration in the displayed image, the user 61 can three-dimensionally recognize an object included in the image. The head mounted display 65 can display an image that gives the user 61 a high sense of presence.

Figure 3:
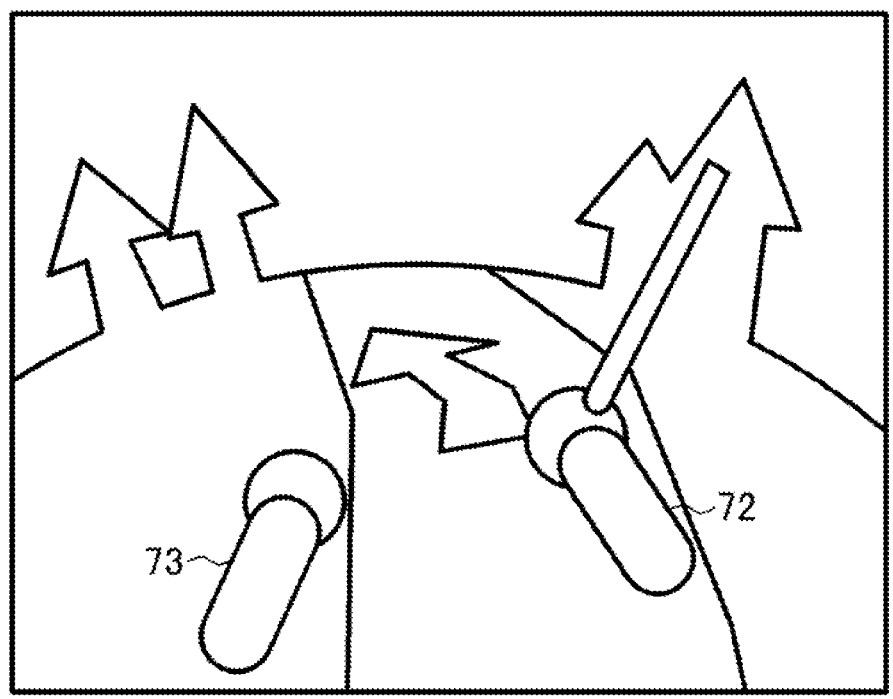
FIG. 3 is a diagram illustrating an example of an image to be displayed.

FIG. 3 is a diagram illustrating an example of the image to be displayed. The image to be displayed in the present embodiment is a three-dimensional image relative to the direction of a viewpoint at the position of the user 61 in a virtual space (hereinafter referred to as "virtual representative position"). In this image, instruction objects 72 and 73 are displayed at positions in the virtual space (hereinafter also referred to as "virtual instruction positions") corresponding to the real instruction positions instructed by the motion controllers 62 and 63. In addition, when the operation of the motion controller 62 or 63 moves the virtual representative position, changes the direction of the viewpoint of the user 61 in the virtual space (hereinafter referred to as "virtual viewpoint direction"), or changes the position or direction of an object within a range in which the image is rendered in the virtual space, the image processing apparatus 1 renders an image with these changes reflected and causes the head mounted display 65 to display the image.

Figure 4:
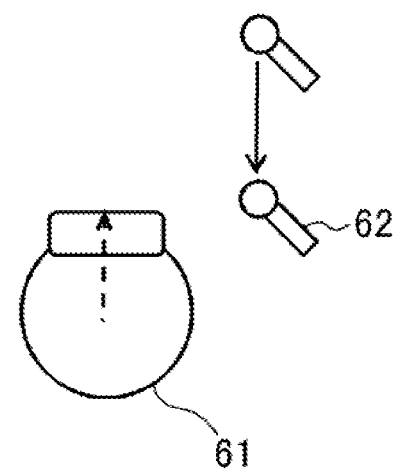
FIG. 4 is a diagram schematically illustrating movement of a virtual representative position when a real instruction position moves closer.
Figure 5:
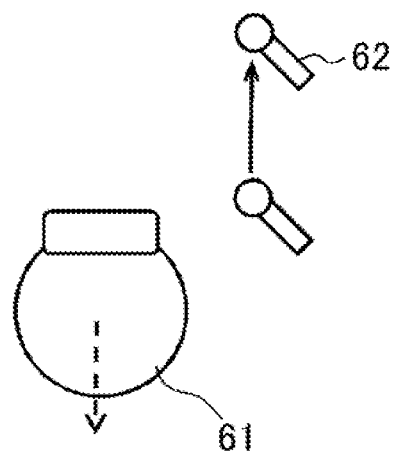
FIG. 5 is a diagram schematically illustrating movement of the virtual representative position when the real instruction position moves away.
Figure 6:
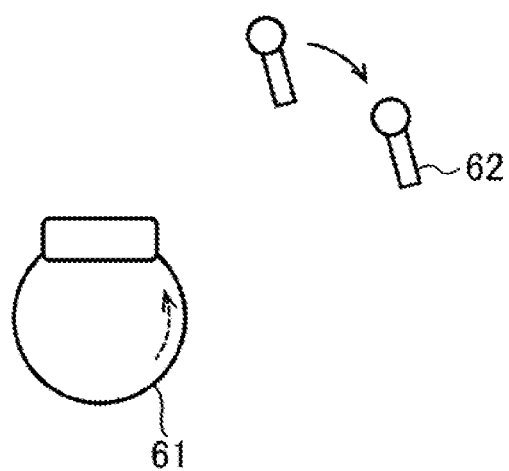
FIG. 6 is a diagram schematically illustrating movement of the virtual representative position when the real instruction position moves to the right.

The image processing apparatus 1 according to the present embodiment moves the virtual representative position on the basis of a horizontal component of the movement of any of the motion controllers 62 and 63 during a predetermined operation (for example, during a period from when the user 61 presses the button to when the user 61 releases the button). FIG. 4 is a diagram schematically illustrating the movement of the virtual representative position when the real instruction position moves closer. FIG. 5 is a diagram schematically illustrating the movement of the virtual representative position when the real instruction position moves away. For example, when the user 61 moves the motion controller 62 or 63 closer, the virtual representative position moves forward (refer to an arrow depicted by a broken line in FIG. 4). When the user 61 moves the motion controller 62 or 63 forward, the virtual representative position moves backward (refer to an arrow depicted by a broken line in FIG. 5). In addition, FIG. 6 is a diagram schematically illustrating the movement of the virtual representative position when the real instruction position moves to the right. For example, when the user 61 moves the motion controller 62 or 63 to the right, virtual viewpoint direction rotates (refer to an arrow depicted by a broken line in FIG. 6) in an opposite direction (left direction) of the direction in which the motion controller 62 or 63 is moved.

In other words, the movement of the virtual instruction position of the motion controller 62 or 63 is restricted while the user 61 holds down the button. In the subsequent movement of the motion controller 62 or 63, the virtual representative position and the virtual viewpoint direction are determined such that a horizontal positional relationship between the motion controller 62 or 63 and the user 61 is maintained. Such an operation is similar to an operation of moving by gripping an object such as a railing of a wall and is easy to understand intuitively.

Note that, instead of the movement of any of the motion controllers 62 and 63 during the period from when the user 61 presses the button to when the user 61 releases the button, the image processing apparatus 1 may move the virtual representative position on the basis of the movement during a period from when the user 61 presses the button to when the user 61 presses the button next.

Figure 7:
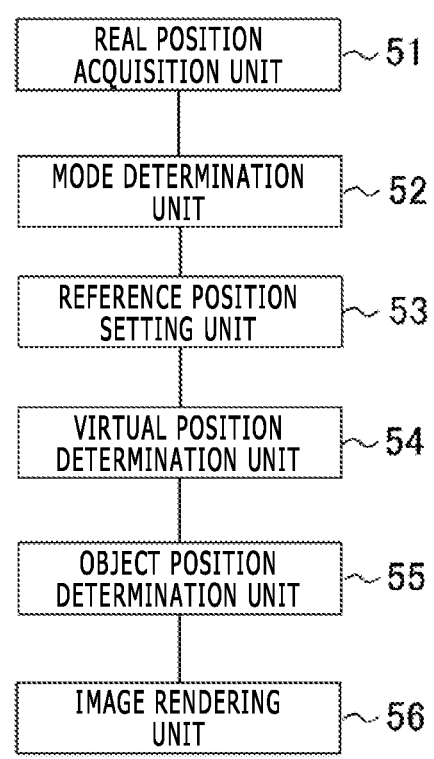
FIG. 7 is a block diagram illustrating functions implemented by the image processing apparatus.

The following describes processing of determining the movement of the virtual representative position from the movement of the real instruction position and rendering an image accordingly. FIG. 7 is a block diagram illustrating functions implemented by the image processing apparatus 1 according to the embodiment of the present invention. Functionally, the image processing apparatus 1 includes a real position acquisition unit 51, a mode determination unit 52, a reference position setting unit 53, a virtual position determination unit 54, an object position determination unit 55, and an image rendering unit 56.

The real position acquisition unit 51 is mainly implemented in such a way that the processor 11 executes the program stored in the storage unit 12, processes information received from the operation input unit 14 that acquires the information from the motion controller 62 or 63 or the camera 64, and stores the result of the processing in the storage unit 12. The mode determination unit 52, the reference position setting unit 53, the virtual position determination unit 54, and the object position determination unit 55 are mainly implemented in such a way that the processor 11 executes the program stored in the storage unit 12, processes information stored in the storage unit 12 or the like, and stores the result of the processing in the storage unit 12. The image rendering unit 56 is mainly implemented in such a way that the processor 11 executes the program stored in the storage unit 12, processes information stored in the storage unit 12 or the like, and controls the display control unit 15 so that the display output device displays an image.

The real position acquisition unit 51 acquires the real instruction positions instructed by the user 61 in the real space. In addition, the real position acquisition unit 51 acquires the position of the user 61 in the real space (referred to as "real representative position"). The real instruction positions and real representative position acquired by the real position acquisition unit 51 are the positions in a three-dimensional space. The real instruction positions are the respective positions instructed by the motion controllers 62 and 63. The real representative position is the position of the head mounted display 65, for example.

The mode determination unit 52 determines whether or not the current mode is a navigation mode on the basis of the operation by the user 61. The navigation mode is a mode that moves the virtual representative position. A period during which the navigation mode is set is a period during which the user 61 performs a predetermined operation such as pressing the button. In the navigation mode, furthermore, the mode determination unit 52 sets a flag (movement flag) and a flag (rotation flag) depending on whether or not the real position at which the user 61 operates is included in a first region or a second region. The flag (movement flag) is for whether or not the virtual representative position is made changeable. The flag (rotation flag) is for whether or not the virtual viewpoint direction is made changeable.

On the basis of the operation by the user 61, the reference position setting unit 53 causes the storage unit 12 to store the real instruction position (reference position) when the button is pressed, as well as the real representative position (reference real representative position), the virtual representative position (reference virtual representative position), and the virtual viewpoint direction (reference viewpoint direction) when the button is pressed. The real instruction position (reference position), the real representative position (reference real representative position), the virtual representative position (reference virtual representative position), and the virtual viewpoint direction (reference viewpoint direction) serve as the reference when the virtual representative position and the virtual viewpoint direction are determined. Note that the virtual viewpoint direction is represented by an angle with the height direction serving as the axis and does not include a component in the vertical direction in the present embodiment.

The virtual position determination unit 54 determines the virtual representative position and the virtual viewpoint direction of the user 61 in the virtual space on the basis of the movement of the real instruction position during a predetermined input. From another perspective, the virtual position determination unit 54 moves the virtual representative position such that the amount of movement of the virtual representative position is determined according to the amount of movement of the real instruction position. More specifically, the virtual position determination unit 54 determines the virtual representative position and the virtual viewpoint direction on the basis of the acquired real instruction position and the reference position. When the real instruction position moves closer to the real representative position, the virtual position determination unit 54 determines the virtual representative position such that the virtual representative position moves closer to the virtual instruction position. On the other hand, when the real instruction position moves away from the real representative position, the virtual position determination unit 54 determines the virtual representative position such that the virtual representative position moves away from the virtual instruction position. In addition, when the current real instruction position is closer to the real representative position than the reference position is, the virtual position determination unit 54 determines the virtual representative position such that the current virtual representative position is positioned closer to the virtual instruction position corresponding to the real instruction position than the reference virtual representative position is. The virtual position determination unit 54 determines the virtual representative position such that the amount of movement of the virtual representative position increases in proportion to the increase in the amount of movement of the real instruction position.

The object position determination unit 55 determines the positions and directions of objects at the present time in the virtual space on the basis of data defining the operations of the objects and whether there is any collision with another object.

The image rendering unit 56 renders a three-dimensional image of the objects in the virtual space on the basis of the determined virtual representative position and virtual viewpoint direction and the determined positions and directions of the objects.

Figure 8:
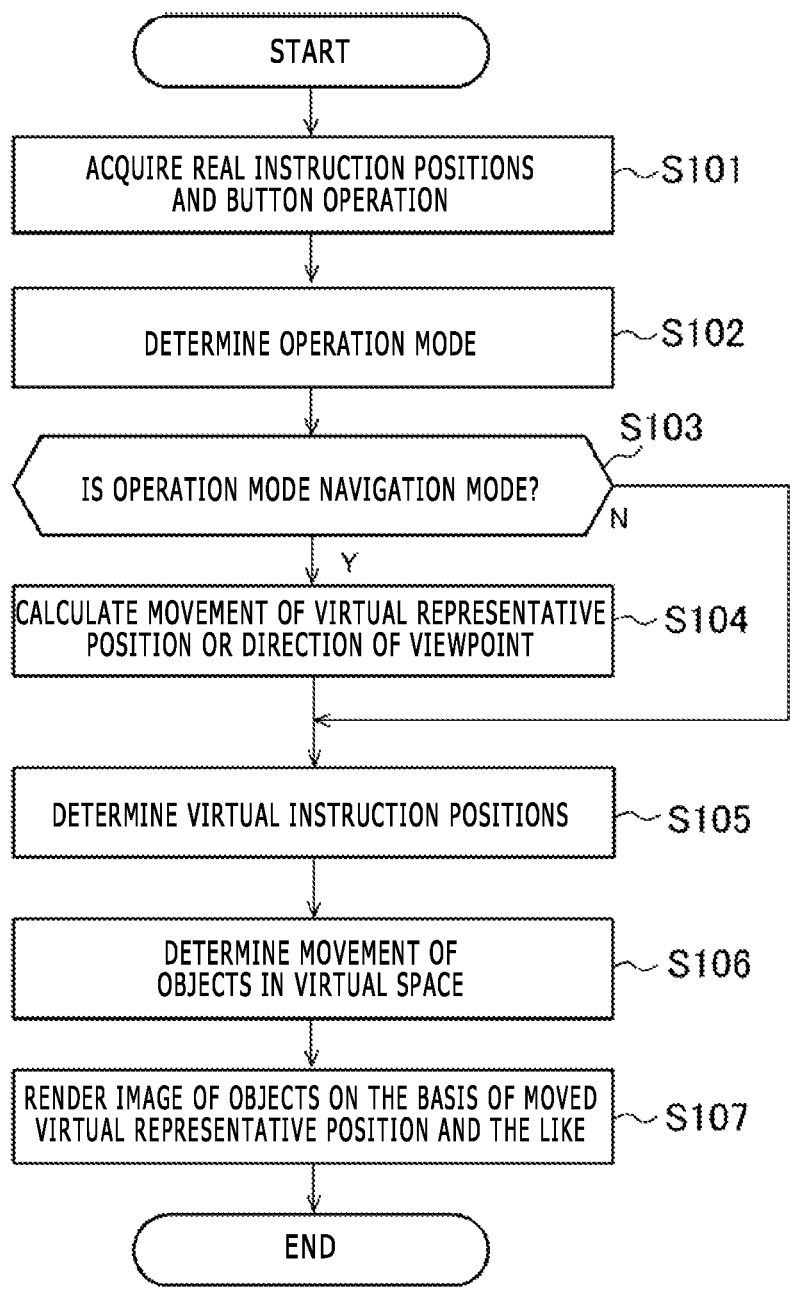
FIG. 8 is a diagram illustrating an example of a processing flow of the image processing apparatus.

FIG. 8 is a diagram illustrating an example of a processing flow of the image processing apparatus 1. First, the real position acquisition unit 51 acquires the real instruction positions and the button operation (step S101). As the button operation, the real position acquisition unit 51 detects each of, for example, whether the button is currently being pressed, the button has been newly pressed, or the button has been released. In addition, the real position acquisition unit 51 also acquires the current real instruction positions and real representative position.

Next, the mode determination unit 52 determines the current operation mode on the basis of the button operation by the user 61 and the corresponding real instruction position (step S102). Specifically, the mode determination unit 52 determines whether or not the current operation mode is the navigation mode. In the case of the navigation mode, the mode determination unit 52 also sets target controller information, the movement flag, and the rotation flag. The target controller information indicates one of the motion controllers 62 and 63 used for changing the virtual representative position and the virtual viewpoint direction (referred to as "target controller"). Note that when the current mode is newly determined as the navigation mode, the reference position setting unit 53 causes the storage unit 12 to store the real instruction position (reference position), the real representative position (reference real representative position), the virtual representative position (reference virtual representative position), and the virtual viewpoint direction (reference viewpoint direction) at this point.

Figure 9:
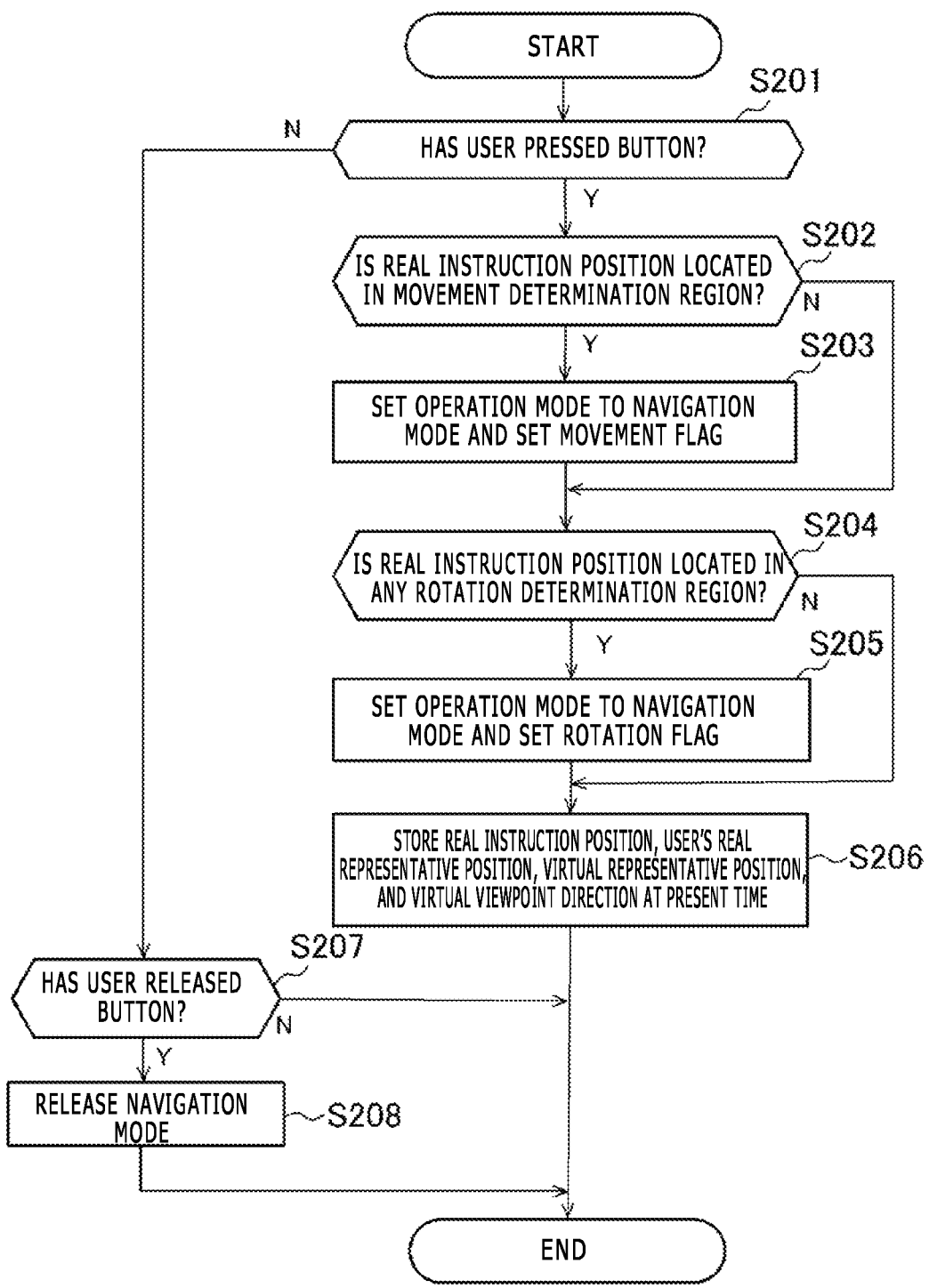
FIG. 9 is a diagram illustrating an example of a processing flow of a mode determination unit and a reference position setting unit.

The following describes step S102 and processing related thereto. FIG. 9 is a diagram illustrating an example of a processing flow of the mode determination unit 52 and the reference position setting unit 53. First, the mode determination unit 52 detects whether or not the user 61 has newly pressed the button included in any of the motion controllers 62 and 63 on the basis of the input from the motion controllers 62 and 63 (step S201). Here, when the button has been newly pressed (Y in step S201), the mode determination unit 52 determines, as the target controller, the motion controller whose button has been pressed, and then determines in which region the real instruction position of the target controller is located. More specifically, when the real instruction position is located in a movement determination region 81 (Y in step S202), the mode determination unit 52 sets the operation mode to the navigation mode and sets the movement flag to ON (step S203). Furthermore, the mode determination unit 52 causes the storage unit 12 to store the target controller information indicating the target controller. In addition, when the real instruction position is located in any rotation determination region 82 (Y in step S204), the mode determination unit 52 sets the operation mode to the navigation mode and sets the rotation flag to ON (step S205). Furthermore, the mode determination unit 52 causes the storage unit 12 to store the target controller information indicating the target controller.

Figure 10:
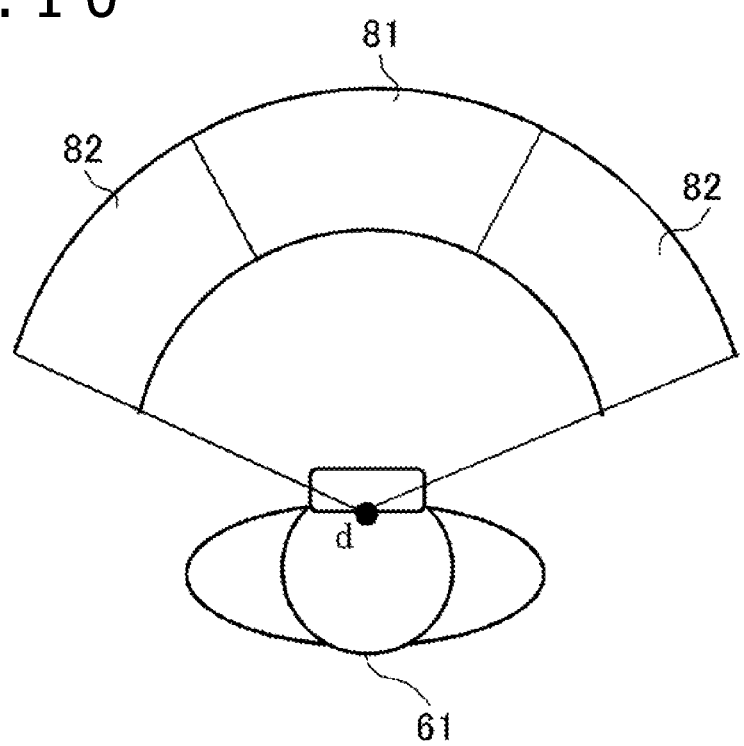
FIG. 10 is a diagram for describing a movement determination region and rotation determination regions in a real space.

FIG. 10 is a diagram for describing the movement determination region 81 and the rotation determination regions 82 in the real space. In the example in FIG. 10, the movement determination region 81 is a region which is located in front of a real representative position d of the user 61 and whose distance from the real representative position d is within a predetermined range. In addition, each rotation determination region 82 is a region which is located on the side of the movement determination region 81 and whose distance from the real representative position d is within a predetermined range. More specifically, the movement determination region 81 is a region whose angle with respect to a straight line extending in front of the user 61 from the real representative position d is equal to or less than a first threshold value and whose distance from the real representative position d is within a predetermined range. Each rotation determination region 82 is a region whose angle is greater than the first threshold value and equal to or less than a second threshold value and whose distance from the real representative position d is within a predetermined range. Note that the movement determination region 81 may overlap the rotation determination regions 82. When the real instruction position is located in an overlapping region, the virtual position determination unit 54 may change both the virtual representative position and the virtual viewpoint direction.

When the real instruction position is not located in any rotation determination region 82 in step S204 or after the processing in step S205 is performed, the reference position setting unit 53 causes the storage unit 12 to store, as the reference position, the real instruction position when the button is newly pressed, while also causing the storage unit 12 to store the real representative position, the virtual representative position, and the virtual viewpoint direction when the button is newly pressed, as the reference real representative position, the reference virtual representative position, and the reference viewpoint direction, respectively (step S206). The reference position, the reference real representative position, and the reference virtual representative position stored in the storage unit 12 are used when the virtual position determination unit 54 determines the virtual representative position and the virtual viewpoint direction. The processing in step S206 may be performed only when the navigation mode is set.

Here, in step S201, when the user 61 has not newly pressed the button (N in step S201) and the user 61 has released the button of the target controller indicated by the target controller information (Y in step S207), the mode determination unit 52 sets the operation mode to a mode different from the navigation mode and releases the navigation mode (step S208). When the user 61 has not released the button (N in step S207), the mode determination unit 52 does not change the operation mode.

When the processing and the like of the mode determination unit 52 in step S102 is performed, the virtual position determination unit 54 determines whether or not the current operation mode is the navigation mode (step S103). When the operation mode is the navigation mode (Y in step S103), the virtual position determination unit 54 calculates the movement of the virtual representative position or the virtual viewpoint direction (step S104). When the operation mode is not the navigation mode (N in step S103), the processing in step S104 is skipped. Thereafter, the virtual position determination unit 54 determines the virtual instruction positions on the basis of the real instruction positions of the motion controllers 62 and 63 (step S105).

Figure 11:
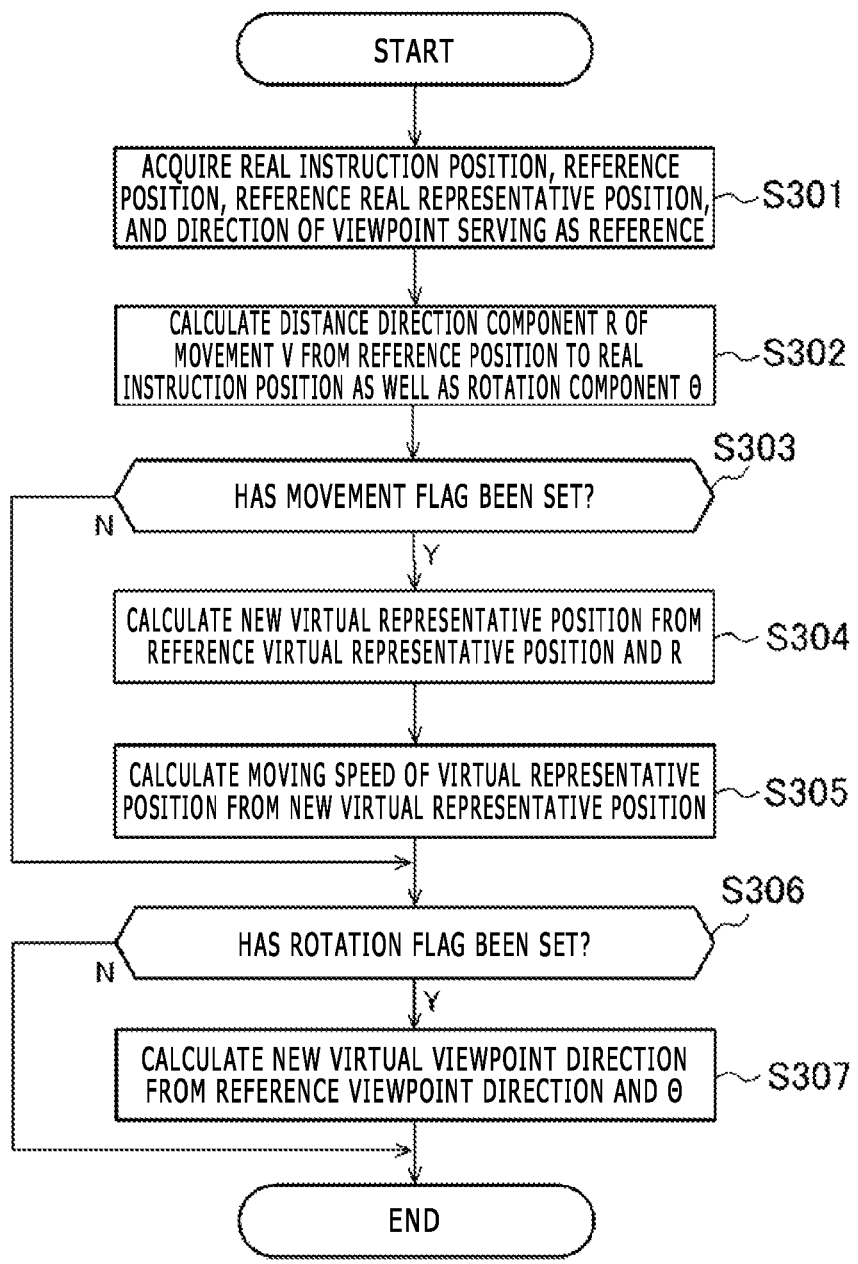
FIG. 11 is a diagram illustrating an example of a processing flow for determining the virtual representative position and a direction of a viewpoint.

FIG. 11 is a diagram illustrating an example of a processing flow for determining the virtual representative position and the virtual viewpoint direction. FIG. 11 illustrates the details of the processing in step S104. In the processing illustrated in FIG. 11, the virtual position determination unit 54 first acquires a current real instruction position c of the target controller acquired by the real position acquisition unit 51 as well as a reference position b, a reference real representative position p, and a reference viewpoint direction stored in the storage unit 12 by the reference position setting unit 53 (step S301). The following processing only uses a horizontal component. Therefore, when the real instruction position c, the reference position b, and the reference real representative position p are, for example, represented by three values in a three-dimensional orthogonal coordinate system, the virtual position determination unit 54 may acquire only two values in the coordinates, excluding the height direction of the real instruction position c, the reference position b, and the reference real representative position p.

Next, the virtual position determination unit 54 calculates a distance direction component R of a horizontal component of a movement vector V from the reference position b to the real instruction position c as well as a rotation angle θ (step S302).

Figure 12:
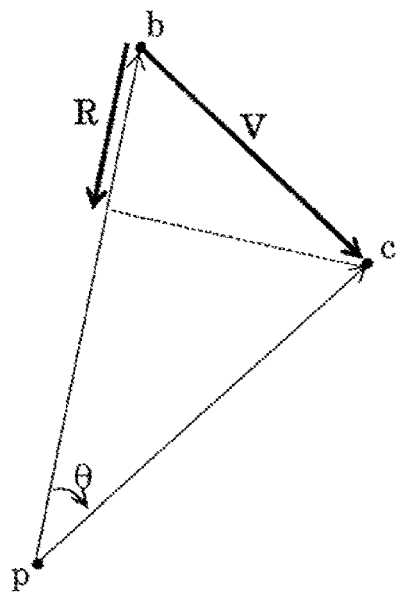
FIG. 12 is a diagram illustrating a relationship among a reference position, a real instruction position, and a reference real representative position in the real space.

FIG. 12 is a diagram illustrating a relationship among the reference position b, the real instruction position c, and the reference real representative position p in the real space. FIG. 12 is a diagram, as viewed from above, illustrating the horizontal component only. The horizontal component of the vector heading from the reference position b to the real instruction position c is the movement vector V. As the distance direction component R of the movement vector V, the virtual position determination unit 54 acquires a vector obtained by projecting the horizontal component of the movement vector V onto a horizontal component of the straight line heading from the reference real representative position p to the reference position b. As the rotation angle θ for the movement vector V, furthermore, the virtual position determination unit 54 acquires an angle between the vector heading from the reference real representative position p to the reference position b and the vector heading from the reference real representative position p to the real instruction position c. Here, the rotation angle θ is determined according to a component (e.g., a component in a direction orthogonal to the distance direction) in a direction different from the distance direction component R of the movement vector V. Note that instead of the real representative position when the button is newly pressed, the current real representative position may be used as the reference real representative position p.

Then, when the movement flag has been set (Y in step S303), the virtual position determination unit 54 calculates a current new virtual representative position from the virtual representative position stored in the storage unit 12 and the distance direction component R of the movement vector V (step S304). More specifically, for example, the virtual position determination unit 54 calculates a tentative position in the real space which is moved from the reference real representative position p stored in the storage unit 12 by the amount corresponding to an opposite vector of the distance direction component R of the movement vector V, and then converts the coordinates of the tentative position in step S304. In this manner, the virtual position determination unit 54 acquires the position in the virtual space corresponding to the tentative position as the new virtual representative position (strictly speaking, the horizontal component of the virtual representative position). Alternatively, the virtual position determination unit 54 may acquire the new virtual representative position (horizontal component of the virtual representative position) by acquiring the opposite vector of the distance direction component R in the virtual space through the conversion of the coordinates of the opposite vector of the distance direction component R of the movement vector V, and calculating the position where the virtual representative position at the reference time is moved by the acquired opposite vector.

Figure 13:
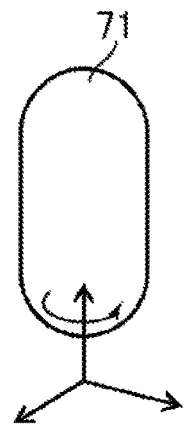
FIG. 13 is a diagram illustrating an example of a proxy.
Figure 14:
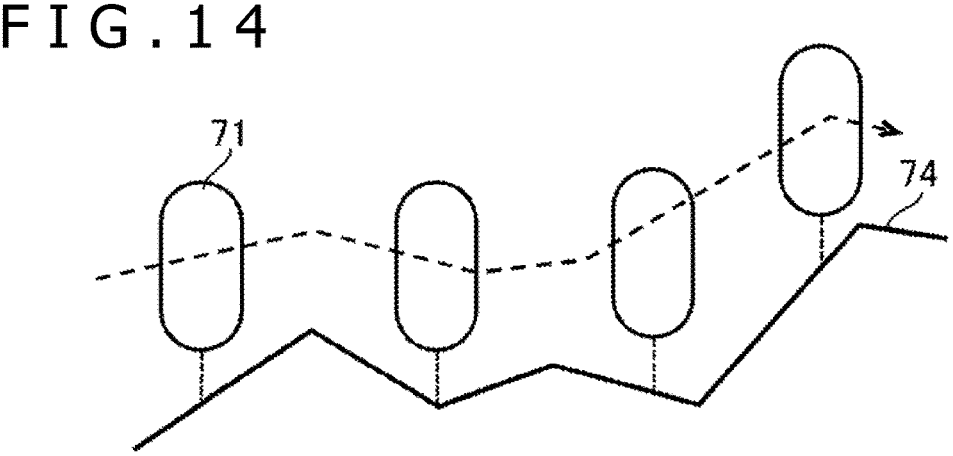
FIG. 14 is a diagram illustrating an example of a relationship between the proxy and the ground in a virtual space.

In addition, the virtual position determination unit 54 acquires a height component of the virtual representative position on the basis of the height of a ground 74 at the horizontal position of the new virtual representative position that has been acquired. FIG. 13 is a diagram for describing an example of a proxy 71 indicating the user 61 in the virtual space. In addition, FIG. 14 is a diagram illustrating an example of a relationship between the proxy 71 and the ground 74 in the virtual space. The center of the proxy 71 exists at the virtual representative position. The proxy 71 floats slightly from the ground 74 and can make only a rotation that is along the axis in the height direction and recognized on the horizontal plane. In addition, the center of the proxy 71 is located at a certain distance away from the ground at the horizontal position. The virtual position determination unit 54 acquires the height of the new virtual representative position by adding a certain value to the height of the ground 74 at the horizontal position of the calculated new virtual representative position, for example. Note that the virtual position determination unit 54 may acquire the height of the virtual representative position, taking into account a posture change and the like due to the horizontal movement.

When the new virtual representative position is calculated, the virtual position determination unit 54 calculates the moving speed of the virtual representative position on the basis of the new virtual representative position (step S304). As the moving speed, the virtual position determination unit 54 may simply calculate the difference between the new virtual representative position and the virtual representative position in the preceding frame or may additionally calculate the moving speed on the basis of another factor such as a posture change.

Note that when the movement flag has not been set in step S303 (N in step S303), the processing in step S304 and step S305 is skipped. Then, the virtual position determination unit 54 determines whether or not the rotation flag has been set (step S306). When the rotation flag has not been set (N in step S306), step S307 is skipped. When the rotation flag has been set (Y in step S306), the virtual position determination unit 54 calculates a new virtual viewpoint direction from the reference viewpoint direction and the rotation angle θ (step S307). More specifically, the virtual position determination unit 54 calculates the new virtual viewpoint direction by rotating the reference viewpoint direction by the rotation angle (−θ) (rotating the reference viewpoint direction in the opposite direction). Note that the virtual position determination unit 54 may calculate the virtual viewpoint direction by additionally using the difference between the direction of the viewpoint when the reference real representative position is stored and the direction of the viewpoint at the present time in the real space. That is, the virtual position determination unit 54 may calculate the virtual viewpoint direction by rotating the reference viewpoint direction by the rotation angle (−θ) and further rotating the reference viewpoint direction by the above-described difference in the rotation direction in the real space.

In the processing and the like from step S301 through step S307, the real instruction position, the real representative position, the virtual representative position, and the virtual viewpoint direction in a preceding frame may be used as the reference position b, the reference real representative position p, the reference virtual representative position, and the reference viewpoint direction, respectively.

The above describes the case where the operation mode is the navigation mode. In step S103, on the other hand, when the operation mode is not the navigation mode (N in step S103), this processing is skipped. Then, the virtual position determination unit 54 determines the virtual instruction positions corresponding to the real instruction positions of the motion controllers 62 and 63 on the basis of the determined virtual representative position and virtual viewpoint direction (step S105). Then, the object position determination unit 55 determines the positions and directions of objects in the virtual space at the present time (step S106). The image rendering unit 56 renders a three-dimensional image of the objects on the basis of the virtual representative position and virtual viewpoint direction that have been moved (step S107).

In the present embodiment, a component in a certain direction in the movement from the reference position to the real instruction position is used to determine the virtual representative position to which the virtual representative position is moved, and on the basis of a component in a direction different from that direction, the rotation angle of the virtual viewpoint direction is calculated. Accordingly, just moving the real instruction position can not only move the virtual representative position but also change the direction of the viewpoint. In addition, the virtual representative position is calculated when the reference position b is located in the movement determination region 81, while the virtual viewpoint direction is calculated when the reference position b is located in any rotation determination region 82. Accordingly, it is possible to reduce the occurrence of a phenomenon where an operation which does not intend any rotation causes rotation as well as the occurrence of a phenomenon where an operation which does not intend any movement causes movement, and the user 61 can adjust the virtual representative position and the virtual viewpoint direction easily.

Figure 15:
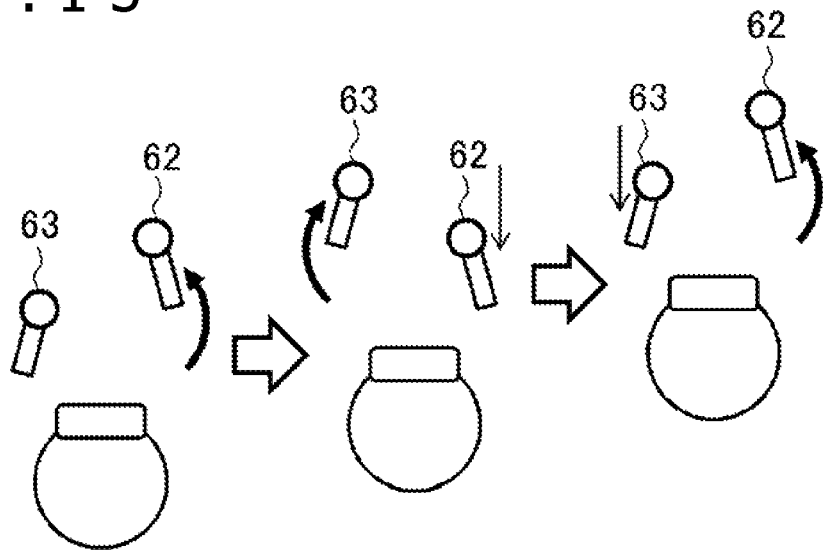
FIG. 15 is a diagram schematically illustrating movement of the virtual representative position by alternately moving both hands.

In the image processing apparatus 1, furthermore, the user 61 can continuously and easily move or rotate in the virtual space by alternately using the left and right motion controllers 62 and 63 for the change in the virtual representative position and the virtual viewpoint direction. FIG. 15 is a diagram schematically illustrating the movement of the virtual representative position by alternately moving both hands. For example, while the user 61 moves the position of the user 61 forward in the virtual space by moving the motion controller 62 gripped by the right hand forward and subsequently moving the motion controller 62 closer in the navigation mode, the user 61 moves the motion controller 63 gripped by the left hand forward. As soon as the movement by the motion controller 62 is finished and the navigation mode is released, the user 61 moves the motion controller 63 closer in the navigation mode. By making such an operation possible in the image processing apparatus 1 according to the present embodiment, the time the position of the user 61 is stopped in the virtual space can be minimized, and the user 61 can intuitively and smoothly move in the virtual space.

Figure 16:
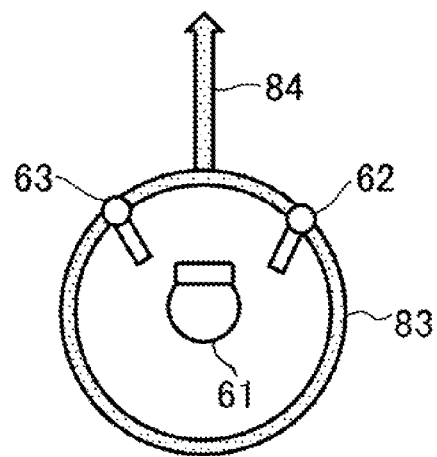
FIG. 16 is a diagram illustrating an example of operation guides displayed in the virtual space.
Figure 17:
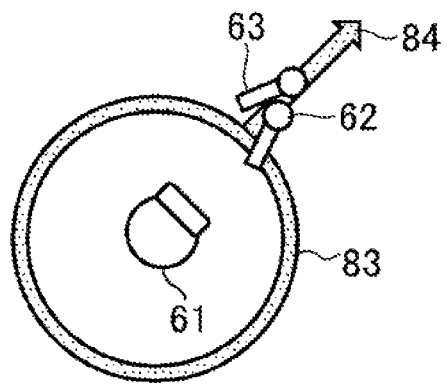
FIG. 17 is a diagram for describing an operation using the operation guides displayed in the virtual space.

Here, when the operation mode is the navigation mode, the image rendering unit 56 may render images of operation guides in addition to the three-dimensional image of the objects. The operation guides serve as guides for the operation by the user 61. FIG. 16 is a diagram illustrating an example of the operation guides displayed in the virtual space. In addition, FIG. 17 is a diagram for describing the operation using the operation guides displayed in the virtual space. In the examples in FIGS. 16 and 17, a rotation guide 83 and a movement guide 84 are displayed as the operation guides in the virtual space. The annular rotation guide 83 is centered at the position of the user 61. The movement guide 84 has the shape of an arrow moving forward in front of the user 61. For example, as illustrated in FIG. 17, when the user 61 moves the real instruction positions indicated by the motion controllers 62 and 63 as if the real instruction positions pull the movement guide 84, the virtual position determination unit 54 may move the virtual representative position. In this case, the method of determining the virtual representative position may be the same as the method described above. In the navigation mode, furthermore, the virtual position determination unit 54 may rotate the virtual viewpoint direction according to the movement of the real instruction positions along the rotation guide 83 by the user 61.

The user 61 can more intuitively perform the rotation or movement operation by moving the real instruction positions of the motion controllers 62 and 63 along the corresponding operation guide.

Figure 18:
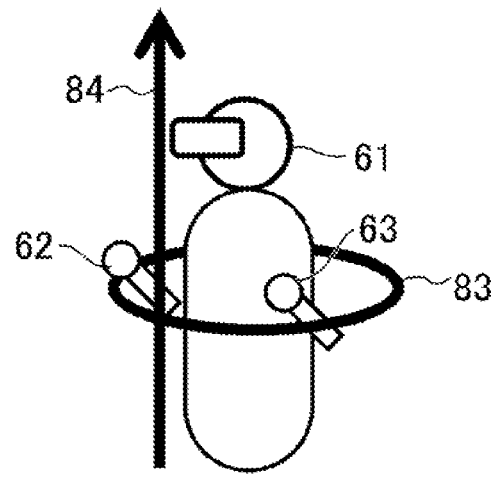
FIG. 18 is a diagram illustrating another example of the operation guides displayed in the virtual space.

Additionally, the movement guide 84 is not necessarily oriented in the horizontal direction. FIG. 18 is a diagram illustrating another example of the operation guides displayed in the virtual space. In the example in FIG. 18, the rotation guide 83 displayed by the image rendering unit 56 is similar to the example in FIG. 16, but the movement guide 84 is oriented in the vertical direction. For example, when the virtual representative position exists in a region in the virtual space where upward and downward movement is possible and the navigation mode is set, the image rendering unit 56 renders the movement guide 84 extending in the vertical direction. When the real instruction position of at least one of the motion controllers 62 and 63 moves along the virtual line corresponding to the movement guide 84, the virtual position determination unit 54 may move the virtual representative position in the direction of the movement guide 84 (the opposite direction of the direction in which the real instruction position moves). In addition, the virtual position determination unit 54 determines the virtual representative position such that the amount of movement of the virtual representative position increases in proportion to the increase in the amount of movement of the real instruction position along the direction of the movement guide 84.

Figure 19:
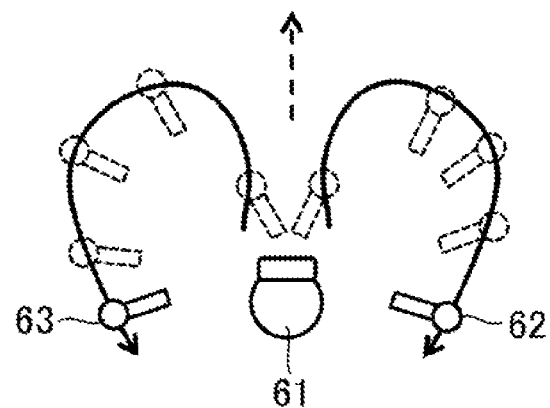
FIG. 19 is a diagram for describing another example of a relationship between movement of real instruction positions and the virtual representative position.
Figure 20:
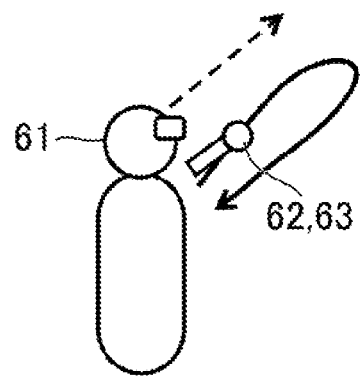
FIG. 20 is a diagram of the movement of the real instruction positions in the example in FIG. 19, as viewed from a side.

In addition, the virtual position determination unit 54 may determine the virtual representative position according to a pattern of movement of the real instruction positions by the user 61 in the navigation mode. FIG. 19 is a diagram illustrating another example of a relationship between the movement of the real instruction positions and the virtual representative position. FIG. 20 is a diagram of the movement of the real instruction positions in the example in FIG. 19, as viewed from a side. FIGS. 19 and 20 are examples in which the virtual representative position is in the water, for example. In FIGS. 19 and 20, the solid lines indicate the movement of the real instruction positions and the broken lines indicate the movement of the virtual representative position. When the real instruction positions move as if pushing against the water, the virtual position determination unit 54 may move the virtual representative position according to the amount of movement and direction of such a movement. In the examples in FIGS. 19 and 20, the virtual position determination unit 54 also determines the virtual representative position such that the amount of movement of the virtual representative position increases in proportion to the increase in the amount of movement of the real instruction positions.

Figure 21:
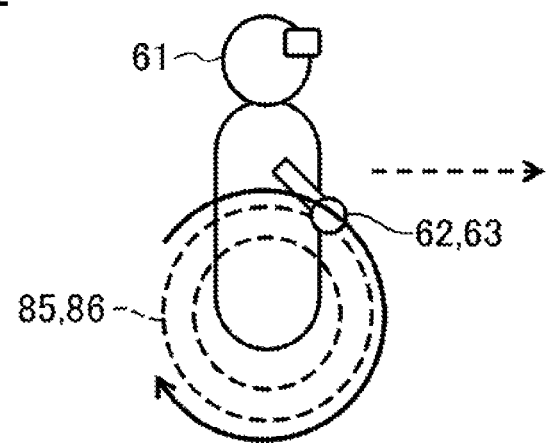
FIG. 21 is a diagram for describing a relationship between movement of the real instruction positions using virtual wheels and the virtual representative position.
Figure 22:
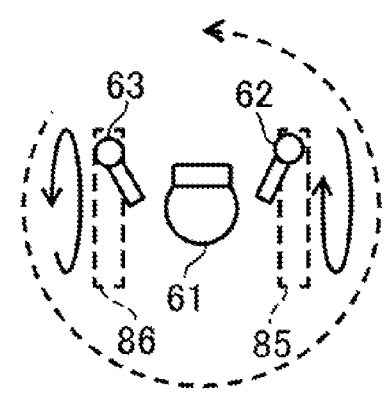
FIG. 22 is a diagram for describing a relationship between movement of the real instruction positions using the virtual wheels and the virtual representative position.

As the pattern of the movement of the real instruction positions, the pattern different from that in FIG. 19 may be used. FIGS. 21 and 22 are diagrams for describing a relationship between the movement of the real instruction positions using virtual wheels 85 and 86 and the virtual representative position. In the examples in FIGS. 21 and 22, the virtual position determination unit 54 determines the virtual representative position according to the movement of the real instruction positions (refer to the solid line in FIG. 21) rotating the virtual wheels 85 and 86 in the navigation mode. The virtual wheels 85 and 86 are positioned on both sides of the user 61 and below the waist of the user 61. In this case, the virtual position determination unit 54 determines the virtual representative position such that the virtual representative position moves in proportion to the amount of movement of the real instruction positions. The virtual wheels 85 and 86 are like wheels of a wheelchair. In the navigation mode, when the user 61 moves the real instruction positions so as to rotate the virtual wheels 85 and 86, the virtual position determination unit 54 moves the virtual representative position according to the virtual rotation of the virtual wheels 85 and 86 by the movement. As illustrated in FIG. 21, for example, when the real instruction positions of the left and right motion controllers 62 and 63 for both of the virtual wheels 85 and 86 rotate in the same direction, the virtual position determination unit 54 moves the virtual representative position forward or backward. In this case, the virtual position determination unit 54 determines the virtual representative position such that the amount of movement of the virtual representative position increases in proportion to the increase in the amount of movement of the real instruction positions. As illustrated in FIG. 22, furthermore, when the directions of the rotation of the virtual wheels 85 and 86 indicated by the movement of the real instruction positions are opposite to each other, the virtual position determination unit 54 rotates the virtual viewpoint direction.

The invention claimed is:

1. An image processing apparatus comprising:
real position acquisition means that acquires a real position instructed by a user in a real space;
representative position determination means that determines, on the basis of movement of the acquired real position during a predetermined input, a virtual representative position that is a position representing the user in a virtual space; and
rendering means that renders a three-dimensional image based on the determined virtual representative position,
wherein when the real position moves closer to a real representative position representing the user, the representative position determination means determines the virtual representative position that is the position representing the user in the virtual space, such that the virtual representative position moves closer to a virtual position corresponding to the real position in the virtual space,
wherein the representative position determination means determines the virtual representative position on the basis of a component in a first direction of a movement vector from a real reference position that is a real position instructed by the user at a given point in time to a real current position that is a current position instructed by the user, and
wherein the first direction is a direction of a straight line connecting the real reference position and the real representative position that have been projected on a horizontal plane.

2. The image processing apparatus according to claim 1, wherein the representative position determination means determines a direction of the user in the virtual space on the basis of a component in a second direction of the movement vector in the real space, and the second direction is different from the first direction.

3. The image processing apparatus according to claim 2, wherein when the real reference position is located in a first region, the representative position determination means determines the virtual representative position on the basis of the component in the first direction of the movement vector from the real reference position to the real current position, while when the real reference position is located in a second region different from the first region, the representative position determination means determines the direction of the user in the virtual space on the basis of the component in the second direction of the movement vector.

4. The image processing apparatus according to claim 3, wherein the first region is located in front of the real representative position, while the second region is located on a side of the first region.

5. The image processing apparatus according to claim 1, wherein the representative position determination means moves the virtual representative position such that an amount of movement of the virtual representative position is proportional to an amount of movement of the real position.

6. An image processing method comprising:
acquiring a real position instructed by a user in a real space;
determining, on the basis of movement of the acquired real position during a predetermined input, a virtual representative position that is a position representing the user in a virtual space;
rendering a three-dimensional image based on the determined virtual representative position;
moving the virtual representative position such that an amount of movement of the virtual representative position is directly proportional to an amount of movement of the real position,
when the real position moves closer to a real representative position representing the user, determining the virtual representative position that is the position representing the user in the virtual space, such that the virtual representative position moves closer to a virtual position corresponding to the real position in the virtual space; and
determining the virtual representative position on the basis of a component in a first direction of a movement vector from a real reference position that is a real position instructed by the user at a given point in time to a real current position that is a current position instructed by the user, wherein the first direction is a direction of a straight line connecting the real reference position and the real representative position that have been projected on a horizontal plane.

7. The image processing method according to claim 6, further comprising:

moving the virtual representative position such that an amount of movement of the virtual representative position is proportional to an amount of movement of the real position.

8. A non-transitory computer readable medium having stored thereon a program for a computer, the program comprising:

by real position acquisition means, acquiring a real position instructed by a user in a real space;

by representative position determination means, determining, on the basis of movement of the acquired real position during a predetermined input, a virtual representative position that is a position representing the user in a virtual space; and by rendering means that, rendering a three-dimensional image based on the determined virtual representative position, wherein when the real position moves closer to a real representative position representing the user, the representative position determination means determines the virtual representative position that is the position representing the user in the virtual space, such that the virtual representative position moves closer to a virtual position corresponding to the real position in the virtual space, wherein the representative position determination means determines the virtual representative position on the basis of a component in a first direction of a movement vector from a real reference position that is a real position instructed by the user at a given point in time to a real current position that is a current position instructed by the user, and wherein the first direction is a direction of a straight line connecting the real reference position and the real representative position that have been projected on a horizontal plane.

9. The non-transitory computer readable medium according to claim 8, wherein the representative position determination means moves the virtual representative position such that an amount of movement of the virtual representative position is proportional to an amount of movement of the real position.

* * * * *